United States Patent [19]
Nakagawa et al.

[11] 3,988,775
[45] Oct. 26, 1976

[54] GHOST SIGNAL SUPPRESSING DEVICE FOR TELEVISION RECEIVER SET
[75] Inventors: Isao Nakagawa, Yokohama; Akira Shibata, Fujisawa; Toshio Murakami, Yokohama, all of Japan
[73] Assignee: Hitachi, Ltd., Tokyo, Japan
[22] Filed: Sept. 15, 1975
[21] Appl. No.: 613,501

[30] Foreign Application Priority Data
Sept. 19, 1974 Japan.............................. 49-107149

[52] U.S. Cl............................. 358/36; 178/DIG. 44; 325/476; 325/331
[51] Int. Cl.²...................... H04N 5/21; H04B 1/68; H04B 1/10
[58] Field of Search ................... 358/35, 36, 31, 21; 178/DIG. 44; 325/474–476, 473, 65, 331

[56] References Cited
UNITED STATES PATENTS
3,482,168  12/1969  Sasao ......................... 178/DIG. 44
3,702,376  11/1972  Isono et al. ......................... 358/31
3,935,536   1/1976  Kimura et al. ................ 178/DIG. 44

Primary Examiner—John C. Martin

[57] ABSTRACT

A ghost signal suppressing device comprises a circuit for suppressing the luminance signal of a ghost signal and a circuit for suppressing the color signal of the ghost signal. A delayed signal used for suppressing the ghost signal is produced at a single delay circuit and branched off to be used for both the suppressing circuits. The branched signals of the same delay time are individually adjusted in their amplitude and then subtracted from an original signal at the respective suppressing circuits.

3 Claims, 5 Drawing Figures

GHOST SIGNAL SUPPRESSING DEVICE FOR TELEVISION RECEIVER SET

BACKGROUND OF THE INVENTION

1. Field of the Invention

This invention relates to a television receiver set, and more particularly to a device, for use in a television receiver set for receiving television signals of vestigial sideband transmission system, capable of improving the picture quality by suppressing an unwanted signal in the form of a ghost signal contained in a desired reception signal.

2. Description of the Prior Art

Hitherto, it has been a practice to use a delay device and a gain control device for the purpose of suppressing a ghost, wherein a reception signal is branched off, one branched signal is delayed by a period of time corresponding to the delay time of the ghost signal by means of the delay device and adjusted in its amplitude by means of the gain control device, and the thus processed branched signal is subtracted from the other branched signal, thereby suppressing the ghost signal. Accordingly, in this method the suppression is effectively performed only when the ghost signal is delayed by a constant time with respect to the desired reception signal and attenuated by a constant quantity, that is, only when the waveform of the ghost signal is analogous to the waveform of the desired reception signal. Practically, however, the ghost signal is unsimilar to the desired reception signal in many cases, mainly because of the present-day broadcasting system which is the vestigial sideband transmission system.

A television signal a(t) received at an antenna can be expressed by the following equation (1), $$a(t) = \{1 + m \cdot s(t)\} \cos \omega_c t + k \{1 + m \cdot s(t-\tau)\} \cos \omega_c (t-\tau) \quad (1)$$

where, $m$ represents the degree of modulation, $s(t)$ a video signal, $\omega_c$ the angular frequency of a carrier wave, $k$ a ratio of the amplitude of a ghost signal to that of a desired reception signal, and $\tau$ a delay time of the ghost signal.

In equation (1) the first term and the second term in the right side represent the desired reception signal and the ghost signal, respectively. Assuming that a phase angle $\phi$ ($0 \leq \phi < 2\pi$) stands $$-\omega_c \tau = 2n\pi + \phi \quad (n: \text{integer}) \quad (2),$$

the second term in the right side of equation (1) is given as follows:

$$k\{1 + m \cdot s(t-\tau)\} \cos (\omega_c t + \phi) \quad (3).$$

Accordingly, it will be understood that the carrier wave of the ghost signal received at the antenna is different in phase by an angle $\phi$ from the carrier wave of the desired reception signal.

Incidentally, under the present-day television broadcasting system of the vestigial sideband transmission system, the low band component of the luminance signal is considered to be transmitted almost under the both sideband transmission system while the high band component of the luminance signal and the color signal are transmitted under the substantial single sideband transmission system. Assuming that a detection stage is the type of a synchronous detection, in case of the both sideband transmission system, the upper sideband component and the lower sideband component appear in a bilaterally symmetric fashion with respect to a symmetric axis of the carrier wave, so that the resultant vector and the carrier wave are always in phase. In consequence, when the synchronous detection is effected with the reference out of phase to the carrier wave by an angle $\phi$, the signal is multiplied by cos $\phi$ through the detection, as can be seen from FIG. 1A.

In case of single sideband transmission system, on the other hand, the single sideband component alone appears as shown in FIG. 1B, and therefore the resultant vector varies in both the amplitude and phase. In addition, with respect to one frequency component of the single sideband, the top of the frequency component vector traces a circle with the result that its amplitude is unchanged even when detected with a reference of any angle but its phase is changed in accordance with the angle of the reference. Accordingly, when the synchronous detection is effected with the reference out of phase to the carrier wave by an angle $\phi$, a signal in the single sideband is detected with the amplitude substantially unchanged, but the time delay of the signal is varied in accordance with the phase difference between the reference and the carrier wave and differs by about several tens nanoseconds in comparison with a detection under the both sideband transmission system. Several tens nanosecond difference in the delay time for the luminance signal does not cause any serious problem on a picture image of television receiver set and is therefore negligible, but when the reference and the carrier wave are out of phase, the amplitude of a detected signal varies in dependence on whether the both sideband transmission system or the single sideband transmission system is employed.

If a desired reception signal contains a ghost signal, since the reference of the synchronous detection and the carrier wave of the desired reception signal are substantially in phase, the reference and the carrier wave of the ghost signal are out of phase by about an angle $\phi$ in accordance with equations (1) and (3). Accordingly, for the above reason, the low band component of the luminance signal of the ghost signal is multiplied by about cos $\phi$ while the high band component of the luminance signal and the color signal remain substantially unchanged, and thus the waveform of the detected ghost signal becomes different from that of the desired reception signal. This substantially holds true when the envelope detection is employed.

Therefore, with a ghost suppressing device which comprises a single delay device and a single gain control device, it is impossible, on one hand, to suppress the high band component of the luminance signal of the ghost signal and the color signal when the low band component of the luminance signal can be surpressed and, on the other hand, impossible to suppress the low band component of the luminance signal of the ghost signal when the high band component containing the color signal can be suppressed. With respect to only the luminance signal of the ghost signal, the energy is concentrated almost in the low band component substantially considered to be associated with the both sideband transmission system and the high band component associated with the single sideband transmission system gives little influence upon visual sensitivity. With respect to the luminance signal alone, therefore, it is sufficient to suppress the low band component. For the color signal, however, since the color signal is transmitted along with the high band component of the luminance signal, it is necessary to suppress the high band component in order that the color signal can be suppressed. Further, even when the time delay of the low band component of the luminance signal of the ghost signal from the original signal is equal to that of the color signal of the ghost signal, the phase difference between the low band component and the original signal is not always equal to that between the color signal and the original signal. Consequently, the suppression of either one of the high band component or the low band component fails to assure a complete suppression of the ghost.

SUMMARY OF THE INVENTION

An object of the invention is to provide a ghost suppressing device of a simple construction capable of effectively suppressing a ghost signal.

Another object of the invention is to provide a ghost suppressing device of a simple construction capable of effectively suppressing both the luminance and color signals of the ghost signal.

Yet another object of the invention is to provide a television receiver set capable of producing an image of improved picture quality by suppressing a ghost signal.

To attain the above objects, a ghost suppressing device according to the invention comprises two polarity and gain control means each provided for the luminance signal and the color signal of a ghost signal, and a single variable delay device used in common, thereby suppressing independently the luminance and color signals.

Strictly speaking, however, with this construction in which a single variable delay device is used in common, it is impossible to provide the time delay simultaneously compatible with the low band component of the luminance signal and the color signal. Since, as described hereinbefore, the difference between the both sideband and single sideband transmission systems practically causes a difference in time delay between the low band component of the luminance signal and the color signal, which difference is usually several tens nanoseconds. In this invention, the time delay to be determined by the variable delay device is set for the color signal. By doing so, although the determined time delay slightly deviates from the time delay required for the low band component of the luminance signal, it was proved that a signal remaining without being cancelled due to such a deviation merely serves to slightly broaden the contour of an image displayed at the most and no serious affect was caused upon visual sensitivity.

DETAILED DESCRIPTION OF THE PREFERRED EMBODIMENTS

Figure 2:
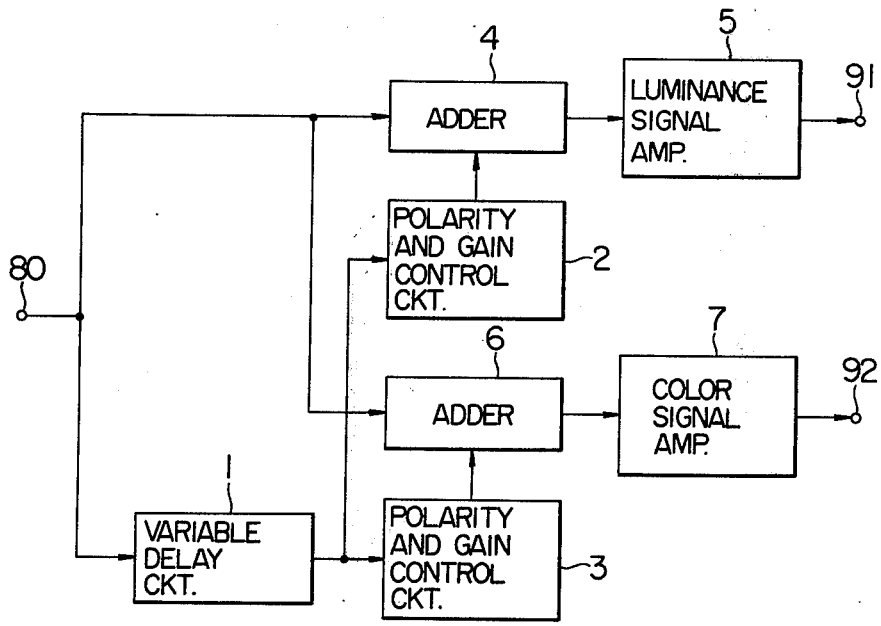
FIG. 2 is a block diagram showing the essential part of an embodiment of a ghost suppressing device according to the invention.

FIG. 2 is a block diagram showing principal parts of an embodiment of a ghost signal suppressing device according to the invention. In FIG. 2, numeral 80 designates an input terminal to which a video signal of base band resulting from a television signal which has been received at an antenna and passed through a tuner and a video detector is applied. When a signal containing such a ghost signal as expressed in equation (1) is received at the antenna and then detected, in a signal appearing at the input terminal 80, the low band component of the luminance signal of the ghost signal is about $k \cos \phi$ times as large as the low band component of the desired reception signal while the high band component of the luminance signal and the color signal of the ghost signal amount to about $k$ times the high band component of the desired reception signal and the color signal thereof, respectively. The signal appearing at the input terminal 80 is so branched off as to be sent to a variable delay circuit 1 and two adders 4 and 6. An output signal of the variable delay circuit 1 is also branched off and sent to polarity and gain control circuits 2 and 3. In the polarity and gain control circuit 2, a video signal which has undergone in the variable delay circuit 1 the same time delay as that of the ghost signal with respect to the desired reception signal is multiplied by $k \cos \phi$ and its polarity is made to be opposite to the polarity of the luminance signal of the ghost signal. Then, an output of the polarity and gain control circuit 2 is added (resulting in subtraction) to the video signal not undergoing a time delay in the adder 4. As a result, the low band component of the luminance signal of the ghost signal can be suppressed. An output of the adder 4 is amplified in an amplifier 5 for the luminance signal and thereafter sent to a video signal processing circuit (not shown) of a television receiver set via an output terminal 91.

In the other polarity and gain control circuit 3, the output of the variable delay circuit 1 is multiplied by $k$ and its polarity is made to be opposite to the polarity of the color signal of the ghost signal. An output of the polarity and gain control circuit 3 is added to the video signal not undergoing the time delay in the adder 6. Consequently, a signal in which the color signal of the ghost signal is suppressed can be obtained at the output terminal of the adder 6. This signal is then amplified in an amplifier 7 which selectively amplifies the color signal and sent to the video signal processing circuit (not shown) via an output terminal 92.

In this manner, a video signal in which the low band component of the luminance signal and the color signal of the ghost signal are suppressed is obtained, and with a ghost suppressing device as described hereinbefore, it is possible to obtain an image of improved picture quality.

Although, with this construction, the high band component of the luminance signal of the ghost signal cannot be suppressed, the energy of the luminance signal of the ghost signal is almost concentrated to the low band region practically considered to be associated with both sideband transmission system and, therefore, an affect on the visual sensitivity due to the failure of suppression of the high band component of the ghost is negligible. For this reason, whenever most of the low band component of the luminance signal and the color signal is suppressed, the effect of improvement in picture quality can be expected and, in effect, an experiment proved that the present invention accomplished an excellent result.

Figure 3:
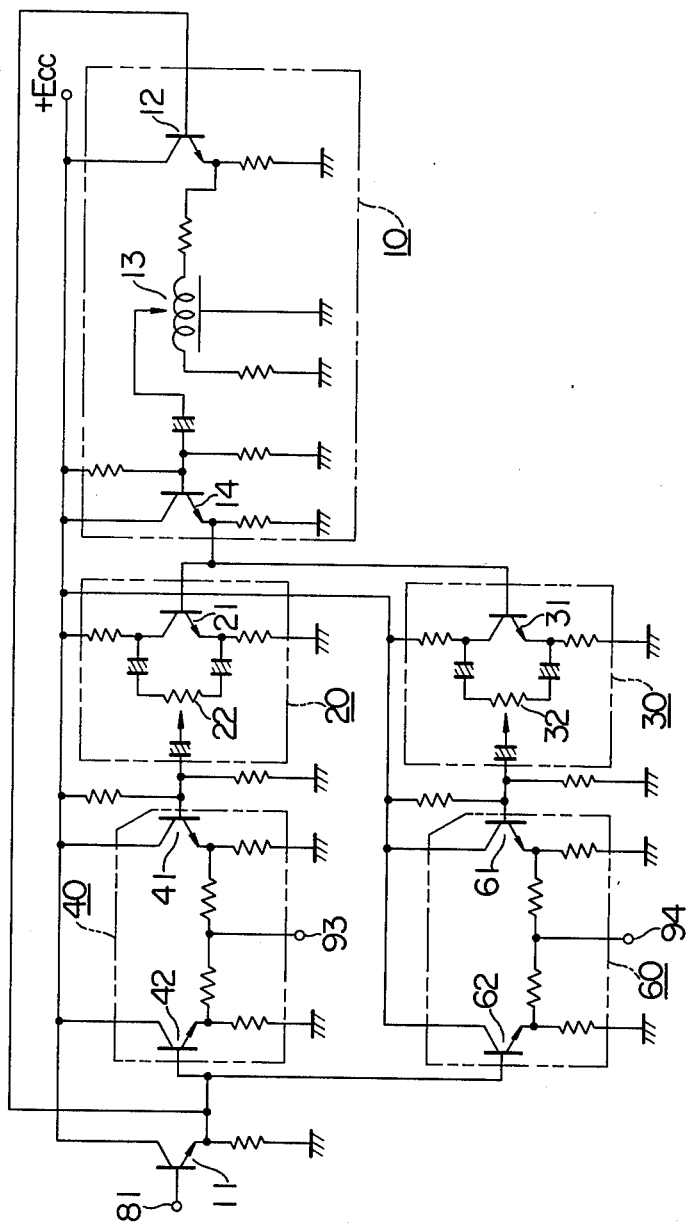
FIG. 3 is a circuit diagram of an example materializing the ghost suppressing device of FIG. 2.

An example of a circuit diagram is illustrated in FIG. 3 which specifically materializes the ghost suppressing device as shown in FIG. 2 in the form of a block diagram.

The video signal applied to an input terminal 81 is branched off through an emitter-follower transistor 11 for impedance converting to be sent to a variable delay circuit 10 and adders 40 and 60. The variable delay circuit 10 comprises a slide delay line 13, an input impedance converting emitter-follower transistor 12 and an output impedance converting emitter-follower transistor 14. Where a wide variable range is required for delaying time, it is advisable to use the slide delay line and several delay cables of different length in combination, so that a desired time delay can be determined by selecting the delay cables for coarse time delay adjustment and setting the slide delay line for fine time delay adjustment. Alternatively, it is advisable to use as the variable delay device a CCD (charge coupled device) such as a charge transfer device in which clock frequencies are designed to be variable. Further, in order to extend the variable range, it is advisable to provide several taps in the way of stages of the charge transfer device and use the selections of the taps and the variable clock frequencies in combination.

A polarity and gain control circuit 20 comprises, as shown in FIG. 3, a transistor 21 and a variable resistor 22. The other polarity and gain control circuit 30 also comprises a transistor 31 and a variable resistor 32. Each of the polarity and gain control circuits 20 and 30 assumes a null gain with the slide tap of the variable resistor 22 (or 32) positioned approximately in center, and also assumes gains of opposite polarities on the respective sides of the center. The adders 40 and 60 are constituted with a pair of transistors 41 and 42 and a pair of transistors 61 and 62, respectively.

In operation, a part of the signal delayed by the variable delay circuit 10 branches to the polarity and gain control circuit 20 in which it is subjected to an adjustment in polarity and gain by means of the variable resistor 22, and reaches the adder 40. In the adder 40, this signal and a part of the output of the transistor 11 are subjected to a subtraction operation with the result that a signal for the luminance signal channel in which the low band component of the luminance signal of the ghost signal is suppressed is delivered to an output terminal 93. Also, the other part of the signal delayed in the variable delay circuit 10 branches to the polarity and gain control circuit 30, and it is adjusted in its polarity and gain by means of the variable resistor 32 and sent to the adder 60 in which it is subtracted by a part of the output of transistor 11, thereby producing at a terminal 94 a signal for the color signal channel in which the color signal of the ghost signal is suppressed. The signals undergoing the ghost suppression, thus produced, are processed through a well-known signal process and displayed.

Figure 1A:
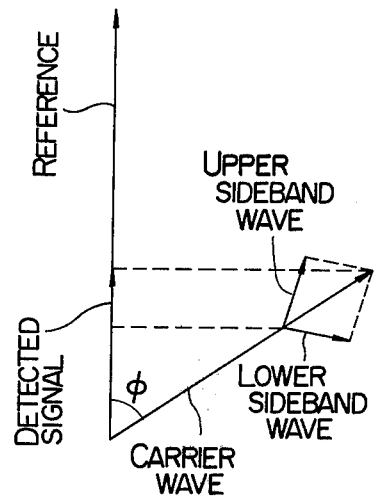
FIGS. 1A is a vector diagram showing the relation between the signal transmitted under the both sideband transmission system and a detected signal.
Figure 1B:
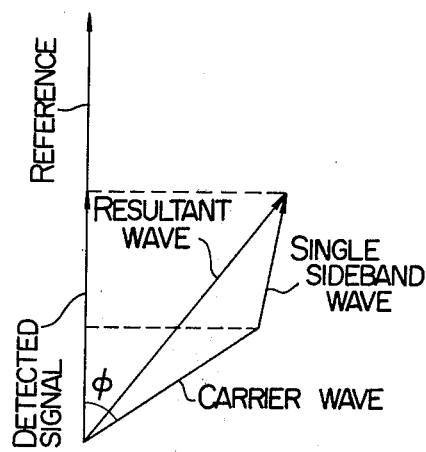
FIG. 1B is a vector diagram showing the relation between a signal transmitted under the single sideband transmission system and a detected signal.

With the ghost suppressing device described hereinbefore, however, it is noted that the determination of the same time delay as that of the ghost wave by means of the variable delay circuit 10, as mentioned in the foregoing is too thoughtless. More particularly, it will be understood from FIG. 1B that, in the single sideband transmission system, the amplitude of the ghost signal is almost constant but the phase thereof is varied. The variation in phase results in a slight variation in the time delay. Therefore, the time delay to be determined in the variable delay circuit 10 is preferably equal to a summation of the time delay of the ghost wave and the above slight time delay variation. This slight variation does not cause a visually fatal change on a displayed picture as far as the luminance signal is concerned, as explained hereinbefore. Such slight variation, however, causes color shading in connection with the color signal, resulting in a visual inferiority. Accordingly, it is desirable that the slight variation in time delay is adjusted so that the time delay of the color signal of the ghost signal and the time delay obtained by the variable delay circuit 10 are made equal. In this case, since the delay time of the luminance signal of the ghost signal is slightly mismatched, the resultant ghost cancellation tends to be incomplete but the remaining portion of the luminance signal not suppressed contributes to slightly broaden the contour of an image at the most, thus causing no adverse affect upon visual sensitivity.

Figure 4:
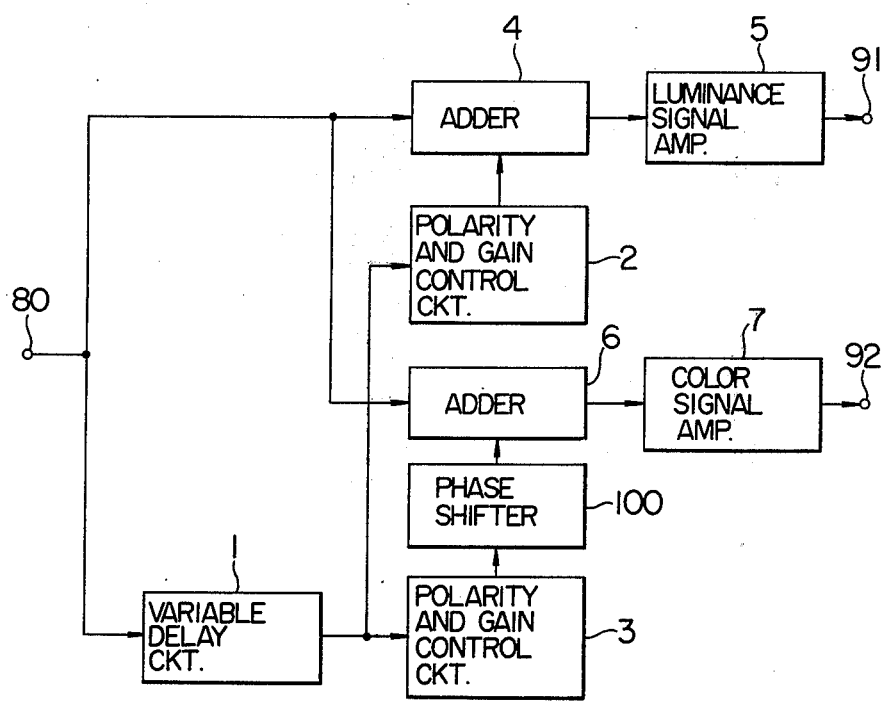
FIG. 4 is a block diagram showing the essential part of another embodiment of the invention.

However, when it is necessitated to eliminate such a slight incompleteness in the suppression of the ghost, a complete ghost suppression can be assured by adding a simple construction. In connection with this, a description will be made below. As generally illustrated in a block diagram of FIG. 4, the problem is solved by simply providing a phase shifter 100 at the output of the polarity and gain control circuit 3 (or 30 in FIG. 3) for the color signal. The time delay to be determined by the variable delay circuit 1 (or 10) is made equal to the time delay of the ghost wave, and the slight variation in time delay is adjusted by the phase shifter 100.

Conversely, for simplification of the construction, the following expedient will be possible. Generally, when an alternating current signal is delayed by an amount corresponding to the phase interval of 180° its polarity is inverted, and in case of a high frequency signal, an extremely small amount of time delay corresponds to the phase interval of 180°. Thus, the color signal transmitted on a subcarrier wave of about 3.58 MHz can be inverted in its polarity by being subjected to a slight time delay. Based on this fact, the polarity and gain control circuit for the color signal channel can be a gain control circuit at which polarity conversion cannot be effected. In this case, the adjustment for the polarity of color signal sometimes prevents the time delay provided by the delay circuit and the time delay of the ghost signal from being made completely equal, but the difference is small and not serious because, as described in the foregoing, it broadens the contour of an image on a picture displayed at the most.

We claim:

1. A device for suppressing a ghost signal contained in a television signal comprising:
    delay means for providing a variable time delay for delaying an input signal;
    a first means for controlling the amplitude of a signal delayed by said delay means and subtracting the delayed signal from the input signal;
    a second means for controlling the amplitude of said delayed signal and subtracting said delayed signal from said input signal;
    means for deriving a luminance signal out of an output terminal of said first means; and
    means for deriving a color signal out of an output terminal of said second means.

2. A device for suppressing a ghost signal contained in a television signal comprising:

delay means for delaying an input signal by a time interval corresponding to a time delay of a color signal of the ghost signal in the television signal with respect to an original signal and delivering a delayed signal;

means for supplying the television signal to said delay means;

a first means for controlling the polarity and amplitude of the delayed signal produced by said delay means;

a first adder means for adding an output of said first means to the television signal and delivering a television signal in which the low band component of the luminance signal of the ghost signal is suppressed;

a second means for controlling the polarity and amplitude of the delayed signal produced by said delay means;

a second adder means for adding an output of said second means to the television signal and delivering a television signal in which the color signal of the ghost signal is suppressed;

means for deriving a luminance signal out of said first adder means; and means for deriving a color signal out of said second adder means.

3. A device for suppressing a ghost signal contained in a television signal comprising:

delay means for delaying an input signal by a time interval corresponding to a time delay of a ghost signal in the television signal with respect to an original signal and delivering a delayed signal;

means for supplying the television signal to said delay means;

a first means for controlling the polarity and amplitude of the delayed signal produced by said delay means;

a first adder means for adding an output of said first means to the television signal and delivering a television signal in which the low band component of the luminance signal of the ghost signal is suppressed;

a second means for controlling the polarity and amplitude of the delayed signal produced by said delay means and shifting the phase of the delayed signal;

a second adder means for adding an output of said second means to the television signal and delivering a television signal in which the color signal of the ghost signal is suppressed;

means for deriving a luminance signal out of said first adder means; and means for deriving a color signal out of said second adder means.

* * * * *